April 16, 1929.        R. W. BRADEN ET AL        1,709,057
DRIFTING VALVE
Filed March 20, 1924        8 Sheets-Sheet 8

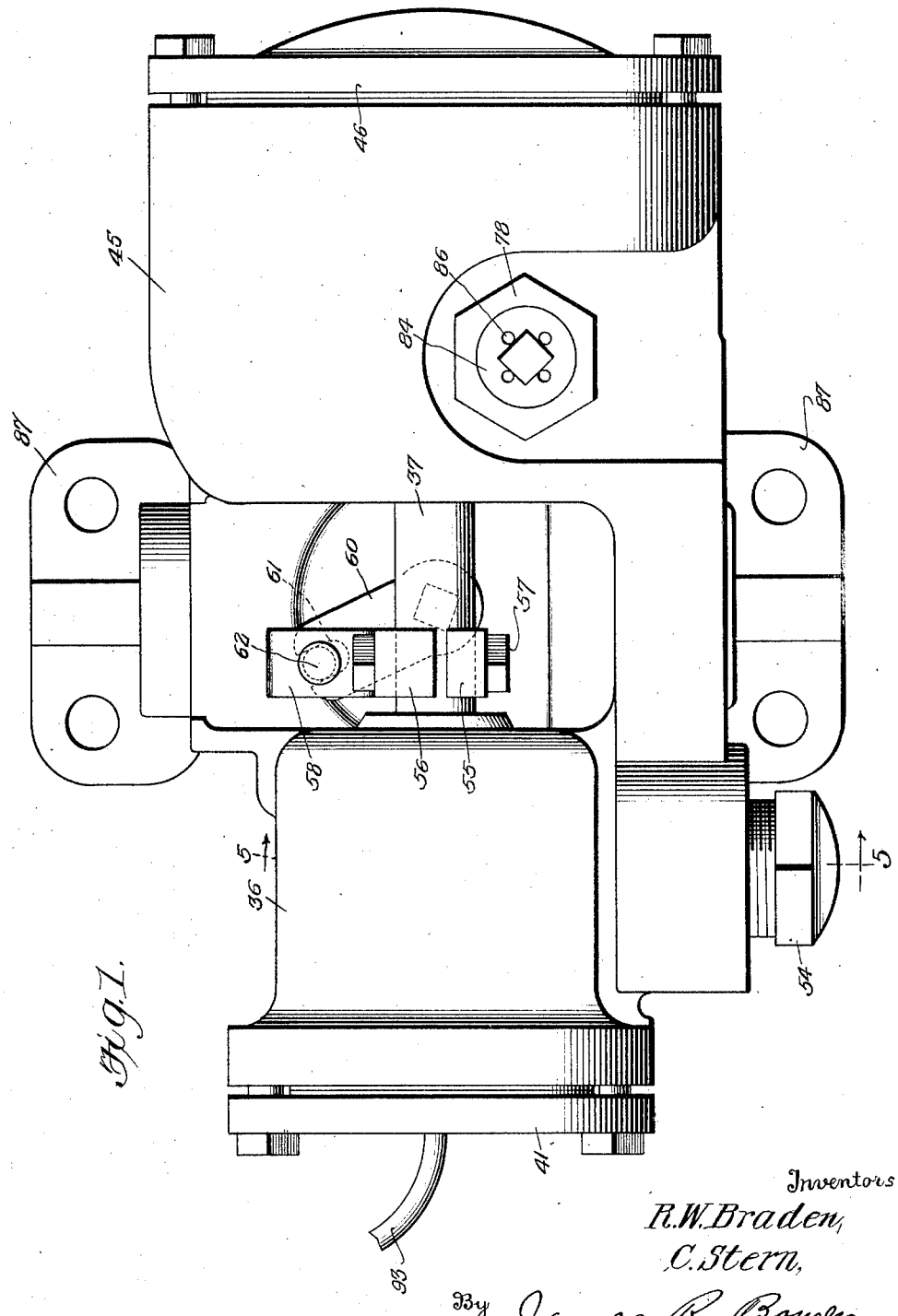

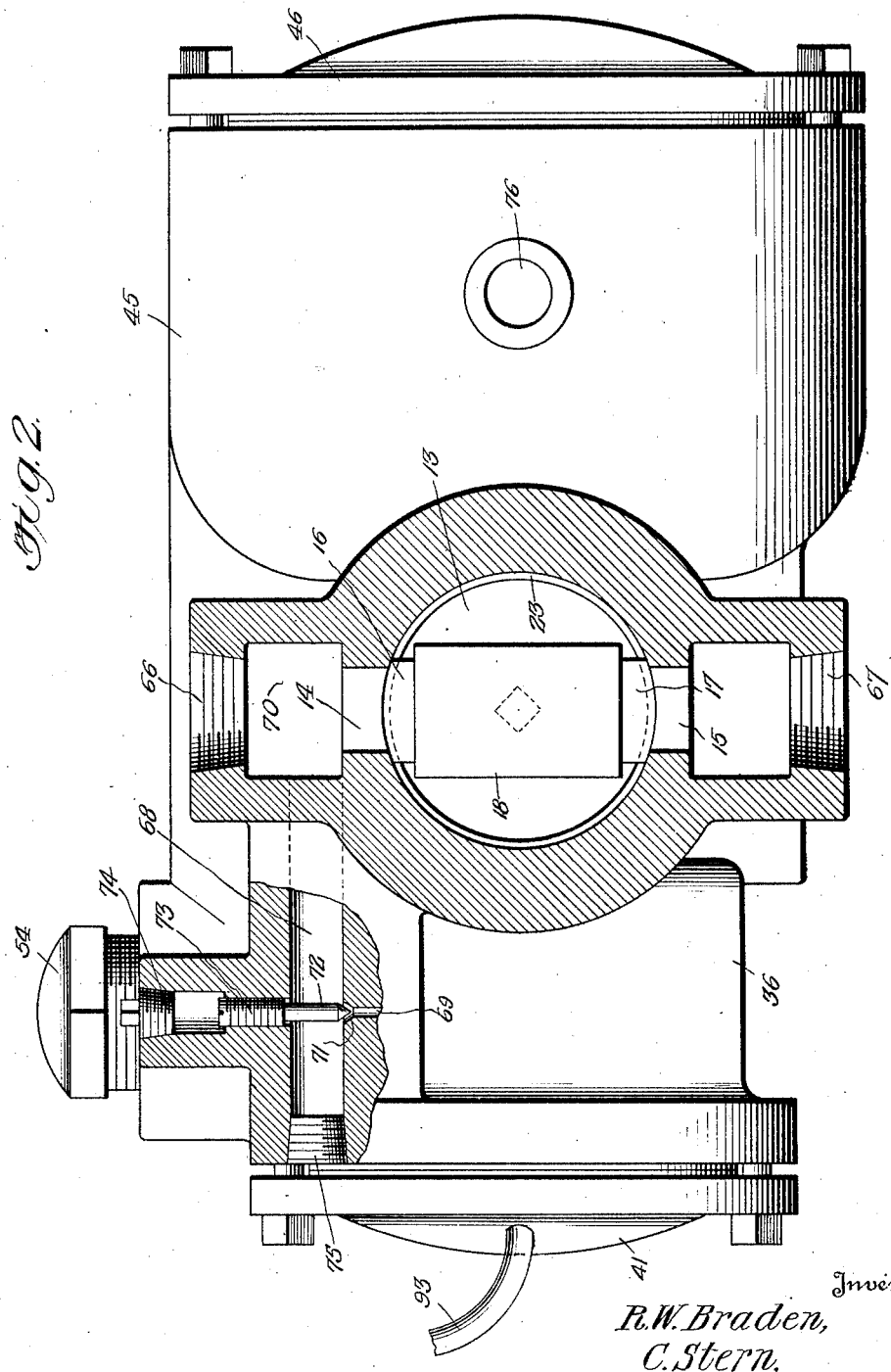

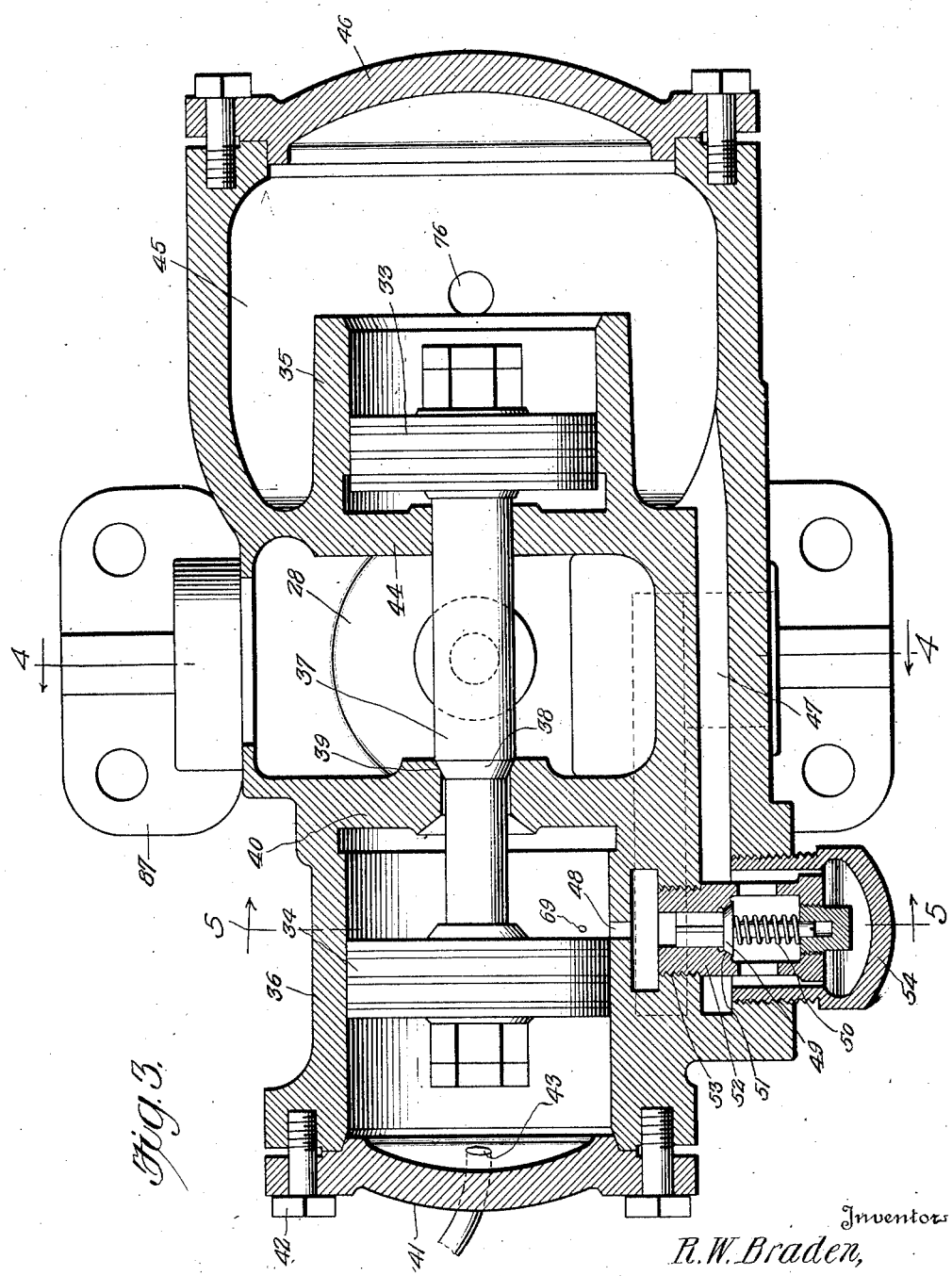

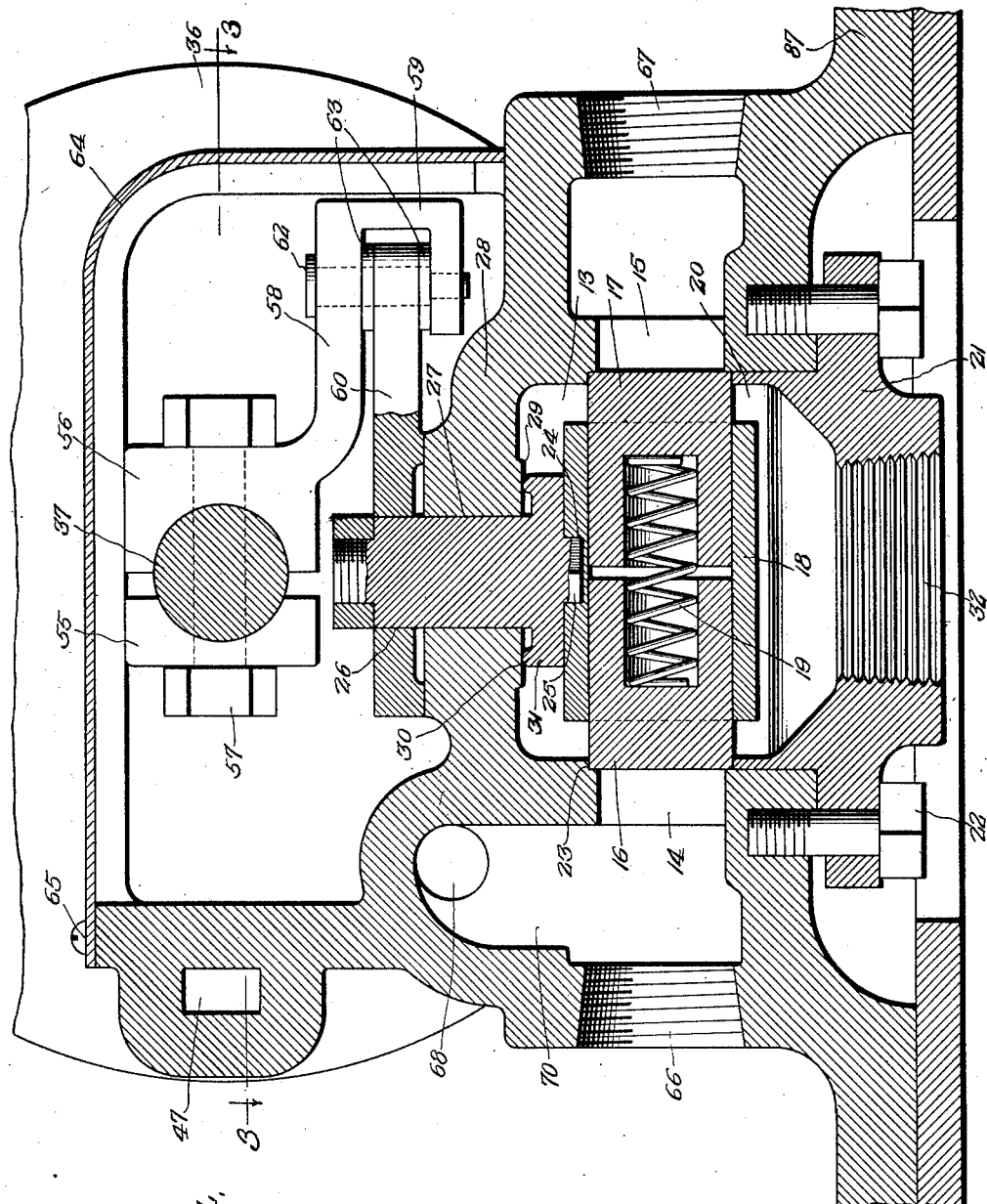

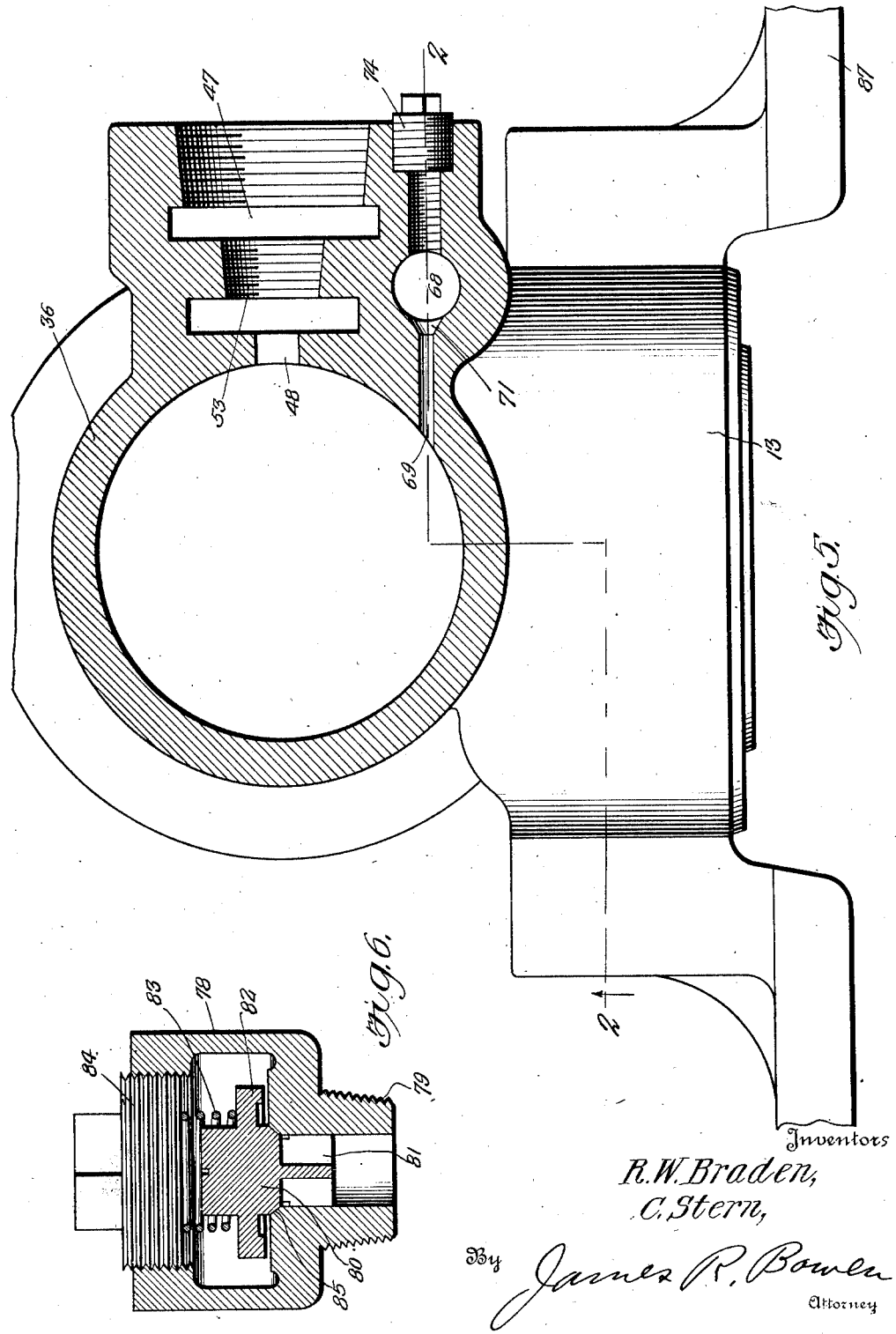

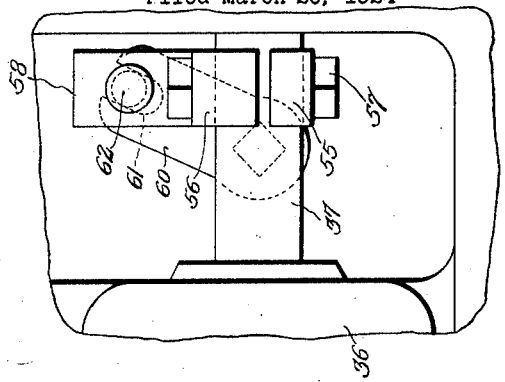

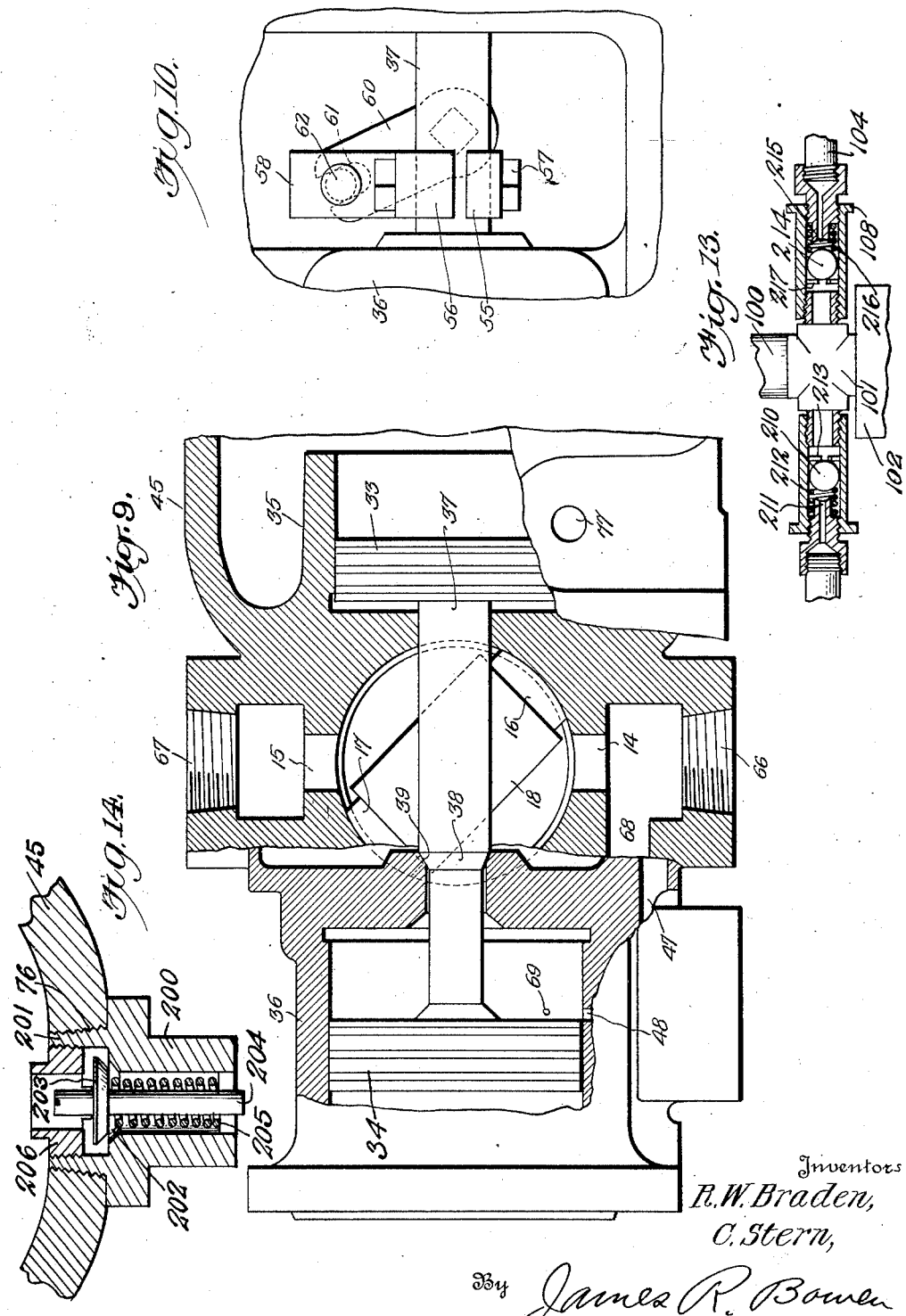

Inventors
R. W. Braden,
C. Stern,
By James R. Bowen
Attorney

Patented Apr. 16, 1929.

1,709,057

UNITED STATES PATENT OFFICE.

RICHARD WALLACE BRADEN, OF NEW YORK, N. Y., AND CHARLES STERN, OF JERSEY CITY, NEW JERSEY.

DRIFTING VALVE.

Application filed March 20, 1924. Serial No. 700,674.

The present invention relates to improvements in locomotive drifting valves and consists in certain improvements over the device shown and described in our prior Patent No. 1,499,037, granted July 1, 1924.

It is an object of the present invention to provide a more suitable casting in which quite a reduction in the amount of metal is secured, the amount of labor also considerably reduced by reason of the rearrangement of the passages and relative parts; as a consequence of which the casting may be produced at much less expense.

The invention also contemplates a rearrangement in which the superheated steam from the locomotive steam supply pipe is led directly from the supply pipe to the outer end of the larger control cylinder, there being a minimum length of pipe so that as soon as the throttle is closed there will be no lag in the exhaust of the steam from the outer face of the larger control piston which otherwise tends to make sluggish the forcing over of the control pistons by reason of the pressure trapped against the outer face of the smaller control piston. It is important that the action take place quickly if it is to take place at all and before a reduction in the accumulated trapped pressure develops.

A further object of the invention resides in bringing the saturated steam from the boiler dome through the bottom cover plate of the feed cylinder instead of through the side thereof. This materially simplifies the casting and it moreover brings the steam in axially of the block which holds the control shoes and therefore tends to hold the shoes accurately in place.

A still further object of the invention lies in providing an improved connection between the piston rod and the shut off block by which ease in movement and greater strength is secured in these parts.

A still further object of the invention consists in providing a novel arrangement of connections between the drifting valve, the valve chests of the locomotive and the opposite ends of the locomotive cylinders from which arrangement a substantially better action is secured.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of an improved drifting valve constructed in accordance with our present invention.

Figure 2 is a section taken on the line 2—2 in Figure 5.

Figure 3 is a horizontal sectional view taken on the line 3—3 in Figure 4.

Figure 4 is an enlarged vertical transverse section taken on the line 4—4 in Figure 3.

Figure 5 is an enlarged transverse vertical section taken through the casting and at the larger cylinder on the line 5—5 in Figure 3.

Figure 6 is a longitudinal section taken through the relief valve.

Figure 7 is a diagrammatic view of the control pistons and the shut off blocks with the blocks in the closed position.

Figure 8 is a fragmentary plan view showing the position of the piston rod arm and shut off block lever corresponding to the position of the parts in Figure 7.

Figure 9 is a diagrammatic view similar to Figure 7 and showing the shut off blocks in the open position.

Figure 10 is a view similar to Figure 8 with the arm and lever in the second position.

Figure 13 is an enlarged fragmentary view partly in elevation and partly in section of a detail, and Figure 14 is a longitudinal section taken through the condensation valve.

Figure 11:
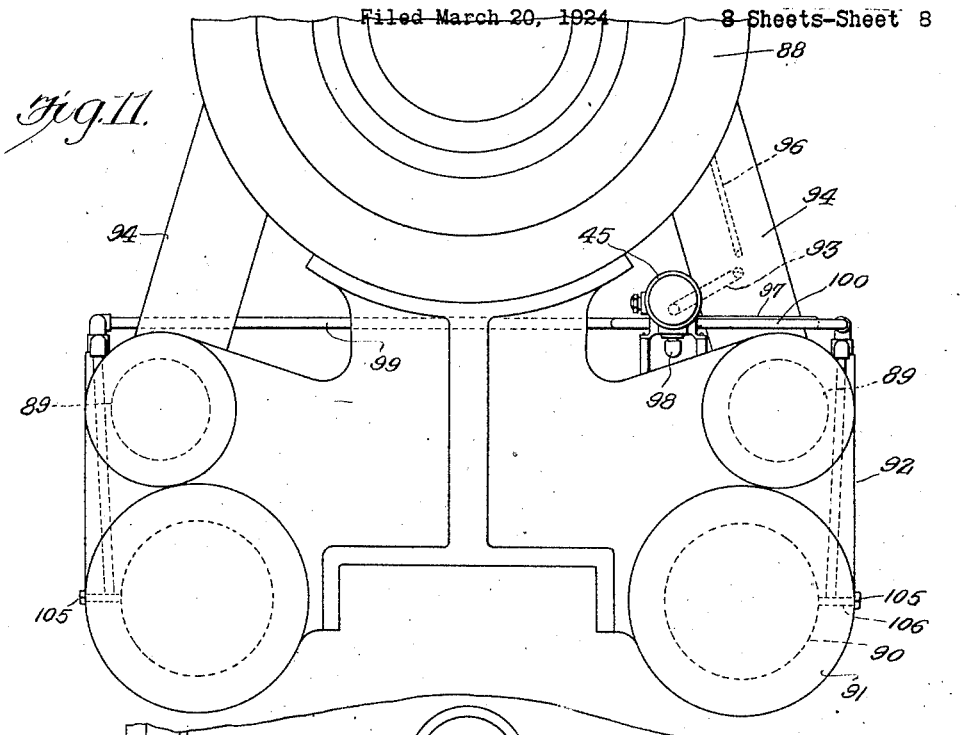
Figure 11 is a fragmentary front view of a locomotive showing the application of the device thereto.

Referring more particularly to the drawings the improved drifting valve is contained within a casting which forms a casing, the casting being produced to form a feed cylinder 13 which receives saturated steam from the boiler of the locomotive and which further supplies this steam through the ports 14 and 15 in the side walls of the feed cylinder to the valve chests of the locomotive under the control of the shut off blocks 16 and 17 which are mounted within the feed cylinder 13, being fitted slidably in the hollow holder 18 and forced yieldably apart by the coil spring 19 which is engaged between the shut off blocks and in mutual recesses thereof.

In the prior construction as shown and described in our patent aforesaid, the hollow holder 18 sustained the shut off blocks but, in accordance with this invention, the shut off blocks are directly supported at their outer edges upon the circular flange 20 which extends up from the bottom cover plate 21 for the feed cylinder, the cover being secured removably to the casting as by the bolts 22. The seating of the outer edges of the shut off blocks upon the flange 20 forms a more stable support for the blocks at or near the ports 14 and 15 and consequently the blocks more effectively seal the ports when closed and prevent leakage of the steam. The upper edges of the blocks are also seated in an annular recess 23 made in the casting and this further serves to stabilize the blocks both during movement and when closed.

The block holder 18 or rather the block connector is provided upon its top wall with a square or other peculiarly shaped socket 24 adapted to receive the square or other complementally formed lug 25 projecting down from the shaft 26 which is mounted through the vertical opening 27 in the roof 28 of the feed cylinder, this roof or top being a part of the casting. The casting on the interior of this roof is reinforced as indicated at 29 in order to cooperate with the upwardly extending bead 30 upon the flange 31 which extends about the shaft 26 at its lower end in contact with the block connector 18. The construction of the shut off blocks and associated parts peculiarly cooperates with the line of introduction of the steam from the boiler, this steam coming in through the bottom opening 32 in the cover 21. In other words the steam comes upwardly and axially of the feed cylinder directly beneath the block connector 18; as a result of which the force of this steam will be effective to push the bead 30 upwardly against the roof 28 of the feed cylinder and tend to constantly form a tight joint about the shaft 27. The pressure and the saturated steam is effectively held within the feed cylinder against casual escape through the ports or about the shaft 26 which produces the opening and closing movement of the shut off blocks.

This movement of the blocks is a rotary one as shown by a comparison of Figures 7 and 9 and the movement is achieved by a pair of control pistons 33 and 34, of which 34 is of larger diameter than the piston 33. These pistons are shown also to advantage in Figure 3 and are mounted for reciprocation in the cylinders 35 and 36 also forming parts of the casting. The pistons are connected together by the piston rod 37 of differential diameter to provide the conical valve seat 38 adapted to close against the similarly formed seat 39 on the inner integral head 40 of the larger cylinder 36. The outer head 41 of the larger cylinder is removable and secured in place as by the use of bolts 42; this head having an opening 43 preferably near its lower edge to receive the steam pipe from the locomotive steam pipe which conveys the superheated steam to the valve chests.

The smaller cylinder 35 is provided with the integral head 44, being a part of the casting, but at its outer end is open and in free continuous communication with the chamber 45 which is a part of the casting and which envelops in part the smaller cylinder 35. The removable head 46 normally closes this chamber but when withdrawn permits of access thereto and to the piston 33.

The chamber 45 and the larger cylinder 36 may communicate through a longitudinal passage 47 in the casting, the passage terminating in a port 48 in the wall of the larger cylinder 36 at one side thereof. The communication through the passage 47 is under the control of the check valve 49 normally closed by the coil spring 50 against the seat 51 in the valve cage 52 which is threaded in to the casting at the point shown at 53. The valve 49 normally and yieldably closes toward the larger cylinder 36 so that steam when collected in sufficient quantity in the cylinder 36 such as to overload the spring 50 may open the valve 49 and escape through the passage 47 into the chamber 45.

The valve cage is enclosed by the dome cap 54 threaded or otherwise secured to the casting. The piston rod 37 as shown in Figure 4 and also to some extent in Figure 1 receives a two-part clamp consisting of the blocks 55 and 56 brought together by the bolt 57 which passes through the piston rod. The block 56 carries the arm 58 which extends downwardly in slightly off set relation from the block 56 and outwardly in a radial direction. The outer end of the arm 58 carries a clip 59 of substantially U-shaped form with the opening therein extending toward and enveloping the outer end of a lever 60 which is fixed to the upwardly projecting portion of the shaft 26. The shaft and arm are appropriately connected and the arm is given a suitable bearing upon the top of the feed cylinder. This arm is also slotted at its outer end as indicated at 61 in Figure 1 for the purpose of sliding upon the pin 62 which has a double bearing or point of support in the arm 58 and lower leg of the clip 59. Appropriate washers 63 may be interposed between the portions of the clip and the slotted part of the lever 60. It will be evident that the lever 60 will be made to move with the piston rod 37 and that movement will occur substantially as indicated in Figures 7 to 10 inclusive.

As shown in Figures 1, 3 and 4 particularly the casing is made hollow between the cylinders and about the intermediate part of the piston rod 37 in order to accommodate the clamp, the arm 58 and the lever 60 and to admit of the free movement of these parts in opening and closing the shut off blocks. However it is advisable to enclose these parts and for this purpose the cover 64 is employed, the cover being substantially L shaped and fitted against the cylinders and adjacent parts of the casting, being secured as by the screws or other fastenings 65.

As will be clear from Figure 4 the casting is of much lesser height than as shown and described in our co-pending application aforesaid. The ports 14 and 15 in the feed cylinder are directly in alinement with the threaded openings 66 and 67 which receive the lateral pipes extending to the steam chests of the locomotive and the shortest possible path is thus produced. Moreover, the passage 68 extends longitudinally beneath the passage 47 and at the same side of the casting therewith. This passage 68 connects with the port 69 leading into the large cylinder 36. The passage 68 communicates at its other end with the hollow space 70 of the casting communicating both with the steam chests of the locomotive and with the port 14 of the feed chamber. In our prior device the passage 68 was on the opposite side of the casting from the passage 47 and this involved considerably more material in the casting and a more difficult and expensive operation in producing the casting.

Figure 5 also shows the relative positions of a port 69 and the port 48 which connect respectively with passages 68 and 47. In this Figure 5, and also in Figure 2 is shown the valve seat 71 for the needle valve 72 provided with the enlarged threaded plug shank 73 screwed adjustably into the casting. A plug 74 closes the opening for the valve and a plug 75 is also screwed into the end of the passage 68. This is removed for cleaning.

The enlarged chamber 45 is provided with its bottom portion with a drain opening 76, in which is placed an appropriate condensation check valve, such for instance as the valve shown in Figure 14. Such valve includes a casing 200 with an internally and externally threaded shank 201 to screw into the opening 76 in the chamber 45. In the intermediate part of the casing is a valve seat 202 for receiving a disc valve 203, which latter is carried upon the reciprocating valve stem 204. The valve is normally held elevated from its seat by the coil spring 205 wound about the lower portion of the stem 204. A nut 206 is threaded upon the interior threads of the shank 201 and serves to retain the valve 203 in place and to permit its assembly with, and removal from, the casing. As shown in Figures 1, 7 and 9, the outer casing forming the enlarged chamber 45 is provided at one side of its top portion with a depression, in the base of which is an opening 77 leading into the smaller chamber 35. This opening 77 is positioned to communicate with opposite sides of the piston 33 accordingly as said piston is in the inner or outer position. As shown in Figure 1 a relief valve 78 is fitted to the opening 77. In Figures 7 and 9, the relief valve has been left out for clearness in showing the action of the piston 33 in uncovering the opening 77 in its two positions, it being remembered that these Figures 7 and 9 are in the nature of diagrammatic views.

Referring to Figure 6 this relief valve comprises the casing 78 having the threaded shank 79 being secured into the opening 77 in the chamber. The valve body is shown at 80 and is provided with the guide wings 81 entering the shank and with the shoulder 82 to receive the lower end of the coil spring 83 which bears at its upper end against the screw block 84 threaded into the upper part of the casing 78. The plug may be turned to effect adjustment of the spring 83. The valve seats at 85 and is shown in the closed position. Pressure accumulating in the chamber 45 above that for which the spring 83 is adjusted will compress the spring and permit escape of the pressure to the atmosphere through the openings shown in Figure 1 at 86 in said plug 84.

Figure 12:
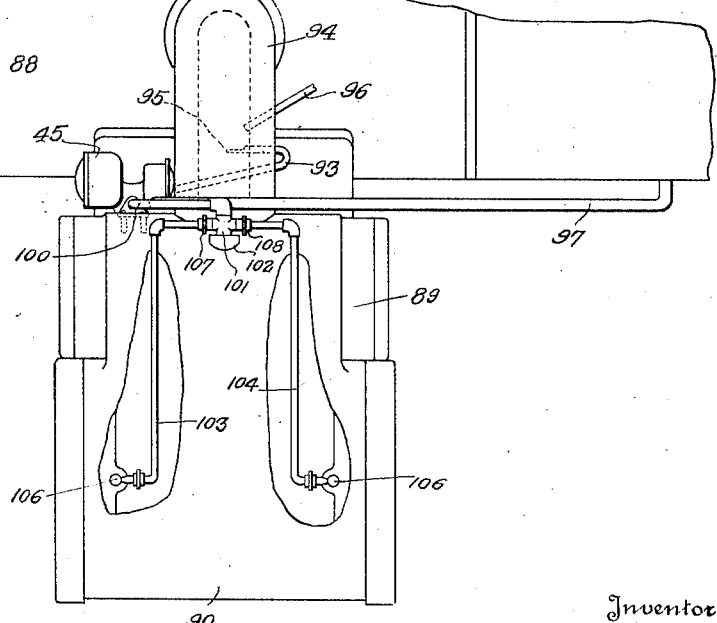
Figure 12 is a fragmentary side view of the same.

The casting is provided with perforated lugs 87 whereby the same may be attached to the locomotive as shown in Figures 11 and 12.

In these figures the locomotive is indicated generally at 88 and the steam chests at 89, the cylinders being indicated at 90 and having the cylinder heads 91. At 92 is shown the sheet iron casing which encloses the asbestos filling.

The improved drifting valve is shown as applied with the large cylinder directed rearward and connected to the superheated steam pipe 94 by means of the short pipe section 93 which enters through the perforation 43 in the head 41 of the large cylinder 36 of the drifting valve.

The pipe section 93 is looped as shown in Figure 12 and one end extends horizontally into the steam pipe 94 and is provided with a cut away protruding end 95 similar to a spoon. This spoon end is disposed beneath the lubricating pipe 96 which comes into the steam pipe, a source of lubricant supply and the spoon is therefore adapted to collect oil and the steam passing through the pipe section 93 will carry the oil with it to the drifting valve.

At 97 is shown the saturated steam pipe from the boiler being connected beneath the drifting valve as indicated at 98 in Figure 11 and specifically entering through the bottom cover of the feed cylinder which cover is shown at 21 in Figure 4. The pipes 99 and 100 which extend from the drifting valve to the steam chests of the locomotive and are screwed into the ports 66 and 67 as shown in Figure 4 incline downwardly in opposite directions from the drifting valve which is supported at a slightly higher elevation to permit of this inclination of the pipes, the inclination carrying off all condensation. These pipes connect with four-way couplings 101, the lower branches 102 of which enter the steam chests 89, while the horizontal branches connect with pipes 103 and 104 which extend respectively to opposite ends of the cylinder 90 and at opposite sides of the piston therein. At 105 are designated the test plugs found in the side of locomotive cylinders closing the test plug ports 106 with which the pipes 103 and 104 connect as shown in both Figures 11 and 12. The pipes 103 and 104 extend within the sheet iron casing 92 and are enclosed in the asbestos filling contained therein.

Check valve casings 107 and 108 are provided in the pipes 103 and 104 and are connected to the four-way coupling 101.

As shown in Figure 13 in the casing 107 is a ball check valve 210 adapted to close against a seat 211 but yieldably urged to the open position by a coil spring 212. At 213 is represented a guard or stop which the ball 210 is adapted to strike in its open position. Similarly the casing 108 at the opposite side of the coupling 101 contains the ball check valve 214 for closing against a seat 215 and normally urged away from the seat by a coil spring 216 and against the stop or guard 217.

In the operation of the device, when the engineer opens the throttle valve of the locomotive, superheated steam flows through the locomotive steam supply pipes 94, shown in Figures 11 and 12, and into the steam chests 89. The steam gets into the pipe section 93 and is conveyed to the outer end of the larger cylinder 36 of the drifting valve. This superheated steam forces the pistons 33 and 34 over and causes the parts to assume the position shown in Figures 7 and 8 in which the shut off blocks 16 and 17 in the feed chamber 13 are in the closed position. The bottom of the feed chamber is, of course, at all times in communication with boiler steam through the pipe 97 shown in Figure 12. The piston 34 in moving over or in moving to the inner position, places the port 48 in communication with the outer portion of the cylinder. The superheated steam consequently flows into this port 48 and against the inner smaller side of the check valve 49, opening this valve by over balancing pressure and escaping through the passage 47 into the chamber 45 at the other end of the casing. This steam is trapped in the chamber by reason of the check valve 49 which has its larger area outward or toward the accumulated steam pressure in the chamber 45 so that should any return flow tend to occur the valve 49 will close, aided in this respect by the coil spring 50. The steam therefore flows from the cylinder 36 into the chamber 45 until substantially a condition of balance occurs whereupon the check valve will close and trap the steam under considerable head.

It will be noted from Figure 7 that the smaller piston 33 when moved over by the superheated steam operating on the larger piston 34, will cut off the communication between the relief valve port 77 and the chamber 45 so that the pressure may not escape through the relief valve. Of course the pressure within the chamber 45 bears directly against the outer face of the smaller piston 33 but, due to the differential area of the pistons, the parts will be held in the position shown in Figure 7 until a reduction of pressure is effected in the outer portion of the larger cylinder 36 and this does not occur until the engineer closes the throttle valve and begins to drift. This is the normal condition of the parts during running of the locomotive with the throttle valve open and it will be apparent that the drifting valve is entirely cut off from other working parts of the locomotive and does not in any way interfere with the customary function of standard locomotive parts.

When the throttle is closed, the pressure in the outer end of the larger cylinder 36 at once falls and this falls very rapidly or substantially instantaneously, due to the direct and short connection between this cylinder and the steam supply pipe. The steam in the passage 47 closes the valve 49, the spring 50 tending to hold the valve closed. The accumulated pressure of steam in the chamber 45 which is held against escape, therefore comes into play quickly against the outer area of the smaller piston 33 and forces the pistons and connecting rod in the opposite direction and into the position shown in Figure 3 and Figure 9. The movement of the piston rod 37 causes corresponding movement in the arm 58 and lever 60 which results in a partial rotation of the shaft 26 and the opening of the shut off blocks. The ports 14 and 15 are consequently opened and the boiler steam in the feed cylinder 13 is permitted to flow out and into the pipes 99 and 100, shown in Figure 11, by which the boiler steam is conveyed to the locomotive valve chests and cylinders for the purpose of moistening and lubricating the parts and breaking the vacuum which tends to form therein during the movement of the locomotive with the throttle closed.

The piston 34 in this position places both the ports 48 and 69 in communication with the inner portion of the larger cylinder 36 and steam from the feed chamber may flow through a passage 68, and through the port 69 to the inner face of the larger piston 34. In this position the valve face 38 on the piston rod will be closed against the seat 39 and will prevent the escape of the steam from this inner portion of the cylinder. The steam in this inner part of the cylinder, may however pass through the port 48, open the check valve 49 and flowing through the passage 47 enter the chamber 45 and present sufficient pressure against the outer face of the smaller piston 33 to keep the two pistons in the position shown in Figures 3 and 9.

When the pressure of steam in the small cylinder 35 and chamber 45 exceeds the pressure of the spring 83 of the relief valve shown in Figure 6, which relief valve is connected to the small cylinder 35 through the port 77, the excess pressure of steam will open the valve and permit discharge of the steam until the spring exceeds the pressure within. This relief valve spring will be generally set to approximately five pounds pressure. This five pounds pressure in the chamber 45 is sufficient to hold the piston 33. In addition there is considerable pressure in the inner portion of the cylinder 36 pushing outwardly against the inner face of the larger piston 34.

When the locomotive is being brought to a stop steam from the steam chest backs up through the steam supply pipe and the pipe section 93 into the outer end of the larger cylinder 36 and when the pressure of this steam overcomes the pressure in front of the piston 34 and in front of the piston 33 the pistons are forced over. The valve face 38 moves away from its seat 39 and permits the escape of pressure from the inner part of the large cylinder 36. The smaller piston 33 will now cut off communication between the chamber 45 and the relief valve and such steam as remains in the chamber 45 may condense and flow out through the port 76. The shut off blocks will of course be closed and steam cut off from the feed cylinder.

New referring to Figures 11 and 12, the check valves 107 and 108 prevent the superheated steam in the steam chests 89 when the throttle is opened, from passing through the pipes 103 and 104, the superheated steam entering the steam chest at a pressure strong enough to close the check valves. In other words no superheated steam may escape past the check valves into the pipes 103 and 104 during the normal running condition of the locomotive with the throttle open.

The saturated steam pressure, however, is not strong enough to close the check valves 210 and 214, so that when the throttle is closed, the boiler steam from the pipes 99 and 100 gets past the check valves and into the two pipes 103 and 104. Steam also flows from the pipes 99 and 100 into the steam chest 89 and enters the cylinders 90 by way of the usual steam ports. When the locomotive is drifting, the pistons in the cylinders 90 will drive the saturated steam received through the pipe 103 on the suction stroke back up through the pipe 103 on its compression stroke and down through the pipe 104 into the opposite end of the cylinders 90. The pipes 103 and 104 in this sense allows the steam to pass freely. This maintains steam in both ends of the cylinders 90 at all times and will not allow vacuum to form. In other words, the locomotive piston has steam before it and steam behind it at all times when it is drifting. Part of this steam will exhaust through the smoke stack but a fresh supply is always at hand.

If, after the drifting valve is shut off, the steam should exist in the front end of the locomotive cylinder, it will be forced by the forwardly traveling piston up through the pipe 103 and down the pipe 104 to the opposite exhaust port and thence out through the stack. If the steam should remain in the rear portion of the cylinder it will be driven by the rearwardly moving locomotive piston up through the pipe 104 and down through the pipe 103 to the forward exhaust port and out through the stack.

It will be understood that considerable saving in metal and a much simpler and less expensive casting is produced by dispensing with the side entrance for the boiler steam to the feed cylinder 13 and arranging the various ports, 14, 15 and 66, 67 in alinement. The introduction of the boiler steam upwardly and axially of the feed cylinder and shut off blocks tends to hold the blocks firmly in position by the incoming steam pressure rather than setting up any tendency to rock in the blocks which is often the cause of leakage.

In the prior device steam was brought in from the steam chests of the locomotive through extensive passages in the casting to the outer end of the larger cylinder; whereas in the present instance a short length of pipe 93 serves to connect the locomotive steam supply pipe 94 directly with the outer end of the larger cylinder 36. The elimination of the passages in the casting simplifies this casting and the action of the superheated steam in exhausting from the larger cylinder when the throttle is closed is not so apt to be sluggish where a direct short outlet is provided as in the case where more lengthy passages are required to take care of this escape of the steam.

The connection between the shut off block valves and the piston rod gives free riding movement and the clips steadies the lever both from above and beneath the pin having a two point support so that it is not permitted to cant or rock in a direction at right angles to its axis.

It is obvious that various changes and modifications may be made in the details of construction and design of the above specifically described embodiment of this invention without departing from the spirit thereof.

What is claimed is:—

1. A locomotive drifting valve comprising a casing having a feed cylinder therein in communication with a source of steam supply, said feed cylinder having connections to the steam chests of the locomotive, valve means in said feed cylinder for controlling the communication between the feed cylinder and the steam chests, cylinders in said casing of differential diameter, pistons mounted to reciprocate in said cylinders, a connecting rod between said pistons, connections between said connecting rod and valve means, the cylinder of larger diameter being disposed toward and close to the locomotive steam supply pipe, a relatively short and direct conduit coupled between the locomotive steam supply pipe and said cylinder of larger diameter for supplying steam to the outer portion of the larger cylinder when the throttle is open, the steam receiving end of said conduit being constructed to receive lubricant together with the steam, the outer portions of said drifting valve cylinders having communication whereby the superheated steam pressure may have access to the outer sides of both pistons, means for trapping the superheated steam pressure against the piston of the smaller area, and means for relieving within limits the trapped steam pressure when the smaller piston is moved to the inner position.

2. A locomotive drifting valve comprising a casing having a feed cylinder in communication with a source of steam supply and having connections to the steam chests of the locomotive, valve means in said feed cylinder for controlling the communication between the feed cylinder and the steam chests, control means for closing, and retaining closed, said valve means when the locomotive throttle is open and for opening said valve means when the locomotive throttle is closed, said control means including opposed cylinders of differential diameter in the casing, connected pistons in the cylinders having connection to said valve means, said cylinders being in communication at their outer ends, means to prevent back flow from the outer portion of the cylinder of smaller diameter to that of larger diameter,—a short and direct connection for superheated steam arranged between the outer portion of the cylinder of greater diameter and a source of superheated steam supply, the steam receiving end of said connection having a portion removed to induce the collection of lubricant thereon and the supply of such lubricant to the drifting valve through said connection.

3. A locomotive drifting valve comprising a casing having a feed cylinder with ports in communication with the locomotive valve chest, said feed cylinder being also in connection with a source of steam supply, a valve in said feed cylinder for controlling the ports, a shaft connected to said valve and extending outside of the feed cylinder, a lever fixed to the projecting part of said shaft, and having a slot in its outer portion, an arm having a substantially U-shaped clip at its outer free end for enveloping the outer slotted portion of the arm, said clip portion having an outer bar connecting the upper and lower portions of the clip and lying across the free end of said lever, a pin having a bearing both above and below said lever in the opposite branches of the clip and playing through the slot in said lever, and means connected to said arm for reciprocating the same.

4. A locomotive drifting valve comprising a casing having a feed cylinder in communication with a source of steam supply and having connections to the steam chests of the locomotive, valve means in said feed cylinder for controlling the communication between the feed cylinder and the steam chests, control means for closing, and retaining closed, said valve means when the locomotive throttle is open and for opening said valve means when the locomotive throttle is closed, said control means including opposed cylinders of differential diameter in the casing, connected pistons in the cylinders having connection to said valve means, said cylinders being in communication at their outer ends, means to prevent back flow from the outer portion of the cylinder of small diameter to that of larger diameter, a short and direct connection for superheated steam arranged between the outer portion of the cylinder of greater diameter and the locomotive steam supply pipe, said connection having a spoon-shaped end in the locomotive steam supply pipe for the collection of lubricant.

In testimony whereof we affix our signatures.

RICHARD WALLACE BRADEN.
CHARLES STERN.